United States Patent
Sung et al.

(10) Patent No.: US 10,530,453 B1
(45) Date of Patent: Jan. 7, 2020

(54) ADAPTIVE BROADCAST BEAM GENERATION OF FD-MIMO SYSTEMS

(71) Applicant: Sprint Communications Company L.P., Overland Park, KS (US)

(72) Inventors: Sanghoon Sung, Ashburn, VA (US); George William Harter, III, Ashburn, VA (US); Udit Anilbhai Thakore, Fairfax, VA (US); Hau Van Tran, Centreville, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/677,357

(22) Filed: Aug. 15, 2017

(51) Int. Cl.
H04B 7/06 (2006.01)
H04B 7/0456 (2017.01)
H04L 5/00 (2006.01)

(52) U.S. Cl.
CPC ........... H04B 7/0639 (2013.01); H04B 7/046 (2013.01); H04B 7/0626 (2013.01); H04B 7/0695 (2013.01); H04L 5/006 (2013.01)

(58) Field of Classification Search
CPC .... H04B 7/0639; H04B 7/046; H04B 7/0626; H04B 7/0695
USPC ....................................................... 375/267
See application file for complete search history.

(56) References Cited

U.S. PATENT DOCUMENTS

| | | | | |
|---|---|---|---|---|
| 2003/0123404 | A1* | 7/2003 | Kasapi ................. | H04W 16/28 370/329 |
| 2008/0144738 | A1* | 6/2008 | Naguib ............... | H04B 7/0617 375/299 |
| 2013/0005376 | A1* | 1/2013 | Shirani-Mehr ..... | H04W 72/048 455/509 |
| 2013/0324076 | A1* | 12/2013 | Harrang ............... | H04W 28/08 455/405 |
| 2016/0269160 | A1* | 9/2016 | Noh ...................... | H04L 5/0048 |
| 2017/0331670 | A1* | 11/2017 | Parkvall ............... | H04J 11/0079 |

* cited by examiner

*Primary Examiner* — Michael R Neff (57) ABSTRACT

A device, method, and computer-readable medium are provided for transmitting control plane information to user equipment (UE) using a Full Dimension MIMO (FD-MIMO) base station. Contextual device data associated with a plurality of mobile devices is obtained. A cluster configuration for a sector is determined based at least in part on the obtained contextual device data. At least one antenna element in a plurality of antenna elements of the FD-MIMO base station that together generate a beamform that corresponds to the determined cluster configuration is selected based on the determined cluster configuration. Control plane information that is directed to the determined cluster configuration is then transmitted from the selected at least one antenna element.

18 Claims, 6 Drawing Sheets

ADAPTIVE BROADCAST BEAM GENERATION OF FD-MIMO SYSTEMS

SUMMARY

A high-level overview of various aspects of the invention are provided here to provide an overview of the disclosure and to introduce a selection of concepts that are further described below in the detailed description section below. This summary is not intended to identify key features or essential features of the claimed subject matter, nor is it intended to be employed as an aid in isolation to determine the scope of the claimed subject matter.

In brief and at a high level, this disclosure describes methods and systems for transmitting data, such as control plane information, to user equipment. Utilizing some embodiments described herein, at least one antenna element is selected from a plurality of antenna elements to generate a particular beamform that is shaped based on a determined cluster configuration. The cluster configuration includes an area that is determined based on contextual device data associated with user equipment located within a vicinity of the plurality of antenna elements. Employing the selected at least one antenna element, control plane information is transmitted to the user equipment via the generated beamform. This disclosure also describes, among other things, methods and systems for determining cluster configurations based on performance indicators. Utilizing some embodiments described herein, a performance score is determined for a generated broadcast beam. A determination is made that the performance score for the generated broadcast beam has dropped, such that another cluster configuration is determined to generate an alternative beamform through which the control plane information is transmitted.

In some embodiments described herein, contextual device data associated with user equipment, such as mobile devices, is obtained. A cluster configuration for a base station sector is determined based at least in part on the obtained contextual device data. At least one antenna element of the base station is selected from a plurality of antenna elements to generate a particular beamform that corresponds to the determined cluster configuration. Transmissions that include data, such as control plane information directed to the user equipment located in the determined cluster configuration, are then transmitted via the particular beamform generated based on the selected at least one antenna element.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of select embodiments provided in the present disclosure is described with specificity herein to meet statutory requirements. The description itself is not intended to define what is regarded as the inventive concept, which is what the claims do. The claimed subject matter may be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
CD-ROM Compact Disk Read Only Memory
CDMA Code Division Multiple Access
eNodeB Evolved Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
UMTS Universal Mobile Telecommunications Systems Further, various technical terms are employed throughout this description. An illustrative resource that fleshes out various aspects of these terms can be found in Newton's Telecom Dictionary, 30th Edition (2016).

Embodiments of the technology may be embodied as, among other things, a device, method, system, or computer-program product. Accordingly, the embodiments may take the form of a hardware embodiment, or an embodiment combining software and hardware. One embodiment described herein takes the form of a computer-program product that includes computer-useable instructions embodied on one or more computer-readable media.

Computer-readable media includes both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently. Computer-storage media does not include transitory, propagating transmission per se.

Communications media typically store computer-useable instructions—including data structures and program modules—in a modulated data transmission. The term "modulated data transmission" refers to a propagated transmission that has one or more of its characteristics set or changed to encode information in the transmission. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
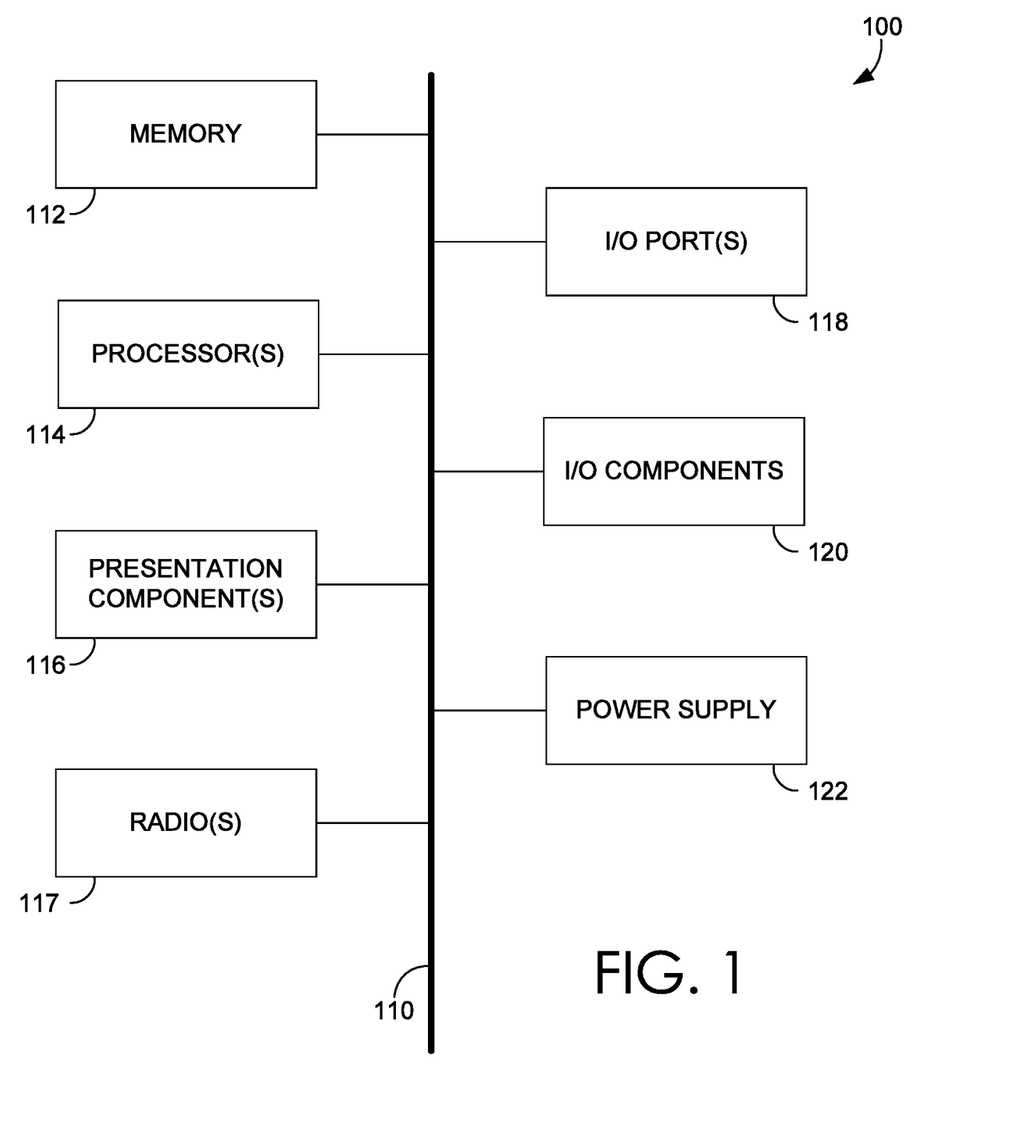
FIG. 1 depicts an exemplary computing device according to implementations of the present disclosure.

Referring to the drawings in general, and initially to FIG. 1 in particular, a block diagram of an illustrative computing device according to one embodiment is provided and referenced generally by the numeral 100. Although some components are shown in the singular, they may be plural. For example, communications device 100 can include multiple processors or multiple radios, etc. As illustratively shown, communications device 100 includes a bus 110 that directly or indirectly couples various components together including memory 112, a processor 114, a presentation component 116, a radio 117, input/output ports 118, input/output components 120, and a power supply 122.

Memory 112 can take the form of memory components previously described. Thus, further elaboration will not be provided here, only to say that memory 112 can include any type of medium that is capable of storing information (e.g., a database). A database can be any collection of records. In one embodiment, memory 112 includes a set of embodied computer-executable instructions that, when executed, facilitate various aspects disclosed herein. These embodied instructions will variously be referred to as "instructions" or an "application" for short.

Processor 114 can be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include COMA, GPRS, TDMA, GSM, WiMax, LTE, and the like. In some embodiments, radio 117 can also facilitate other types of wireless communications including Wi-Fi communications and GIS communications. As can be appreciated, in various embodiments, radio 117 can be configured to support multiple technologies and/or multiple radios can be utilized to support a technology or multiple technologies.

Input/output ports 118 can take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

By way of background, a traditional telecommunications network employs a plurality of base stations (e.g., cell sites, cell towers) to provide network coverage. The base stations are employed to broadcast and transmit transmissions to user devices of the telecommunications network. Factors that can affect the telecommunications transmission includes, e.g., location of the base stations, size of the base station, frequency of the transmission, among other factors.

Generally, a conventional antenna has a built-in beam pattern. In other words, the antenna beam patterns are fixed once the antenna is installed at a base station. While the direction of a beam can be modified manually or with antenna motors, the transmission beam emitted by the antenna is generally of a fixed shape and distance. A full dimension multiple input multiple output (FD-MIMO) antenna, on the other hand, can generate a more focused beam that is directed to one or more devices within a general vicinity of the antenna. A FD-MIMO base station can include multiple antenna elements and transmitters that broadcast, transmit and receive transmissions. With FD-MIMO technology, a base station can form a beam in both horizontal and vertical directions so that the transmission of a transmission can be more focused and directed to a particular area and location within its transmission range.

Beamforming is conventionally employed to provide a directional data transmission to a specific user device, so that data on a traffic channel or data plane can be sent to that specific user device. However, beamforming has typically been employed to provide data to that specific user device and not to a group of user devices located within in a given sector.

In accordance with embodiments described herein, contextual device data associated with a plurality of user devices can be collected and analyzed to determine and employ customized beam patterns to broadcast transmissions to the user devices. For example, contextual device data, such as user device locations and associated timestamps, can be employed to determine a cluster configuration (e.g., area, shape, distance), or an expected cluster configuration, for a sector of a base station at any particular time. One or more antenna elements of an FD-MIMO antenna can be selected based on the determined cluster configuration for a particular time. The antenna element(s) can be selected by referencing a lookup table or other mechanism that identifies a subset of antenna elements of a base station that, together, can beamform a transmission that corresponds to the determined cluster configuration. The selected one or more antenna elements can then be employed to transmit data, such as control plane information, directed to the cluster configuration (or expected cluster configuration) at a particular time. In some further embodiments, if performance of the determined cluster configuration drops, alternate cluster configurations can be determined and/or employed by the base station.

As employed herein, user equipment (UE) (also referenced herein as a user device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

As referenced herein, the control plane refers to the broadcast transmissions that carry control information (e.g., provisioning data) of the network. This differs from the data plane, which carries the network traffic (e.g., communication data). In LTE, certain resource blocks of specific orthogonal frequency-division multiplexing (OFDM) symbols are employed for control channel transmission. Examples of control plane information includes Broadcast Control Channel (BCCH), which is employed for transferring system control information; Paging Control Channel (PCCH), which carries paging information and system information change; Common Control Channel (CCCH), which transmits control information between UEs and network; Multicast Control Channel (MCCH), which transmits Multimedia Broadcast Multicast Services (MBMS) control information from the network to the UE; Dedicated Control Channel (DCCH), which transfers dedicated control information between UE and a network.

Utilizing embodiments described herein, contextual device data associated with a plurality of mobile devices is obtained. For example, a user device location can be obtained by location reports from the user devices or by the eNodeB location tracking feature (a specification of LTE). It should be understood that other types of contextual device data can be also be obtained from the user devices. A cluster configuration for a sector is determined based at least in part on the obtained contextual device data. At least one antenna element is selected from a plurality of antenna elements based on a determination that when transmitting together, the selected antenna elements generate a beamform that provides transmission coverage over a particular area that corresponds to the determined cluster configuration. Control plane information that is directed to the determined cluster configuration is then transmitted from the selected at least one antenna element.

Accordingly, in a first aspect of the present disclosure, an embodiment is directed to a computer-implemented method for transmitting control plane information to UE. The method includes obtaining contextual device data associated with a plurality of mobile devices; determining a cluster configuration for a sector based at least in part on the obtained contextual device data; selecting, based on the determined cluster configuration, at least one antenna element in a plurality of antenna elements that together generate a beamform that corresponds to the determined cluster configuration; and transmitting, from the selected at least one antenna element, control plane information that is directed to the determined cluster configuration.

In a second of the present disclosure, an embodiment is directed to a non-transitory computer storage medium storing computer-useable instructions that, when employed by one or more computing devices, cause the one or more computing devices to perform operations for transmitting control plane information to UE. The operations include calculating weights for a plurality of beamforms; determining a cluster configuration for a sector based on the calculated weights; and providing the determined cluster configuration to an antenna array controller to transmit control plane information to a plurality of mobile devices, the control plane information being transmitted by at least one antenna element in a plurality of antenna elements of the base station that is directed to the determined cluster configuration.

In a third aspect of the present disclosure, an embodiment is directed to a base station comprising an array of antenna elements; one or more processors; and one or more computer storage media storing computer-usable instructions that, when employed by the one or more processors, cause the one or more processors to: obtain contextual device data associated with a plurality of mobile devices; determine one or more cluster configurations for a sector based at least in part on the obtained contextual device data; select one of the one or more cluster configurations based on pre-determined weights assigned to the one or more cluster configurations; select, based on the selected cluster configuration, at least one antenna element of the plurality of antenna elements of the base station that together generate a beamform that corresponds to the selected cluster configuration; and transmit, from the selected at least one antenna element, control plane information that is directed to the selected cluster configuration.

Figure 2A:
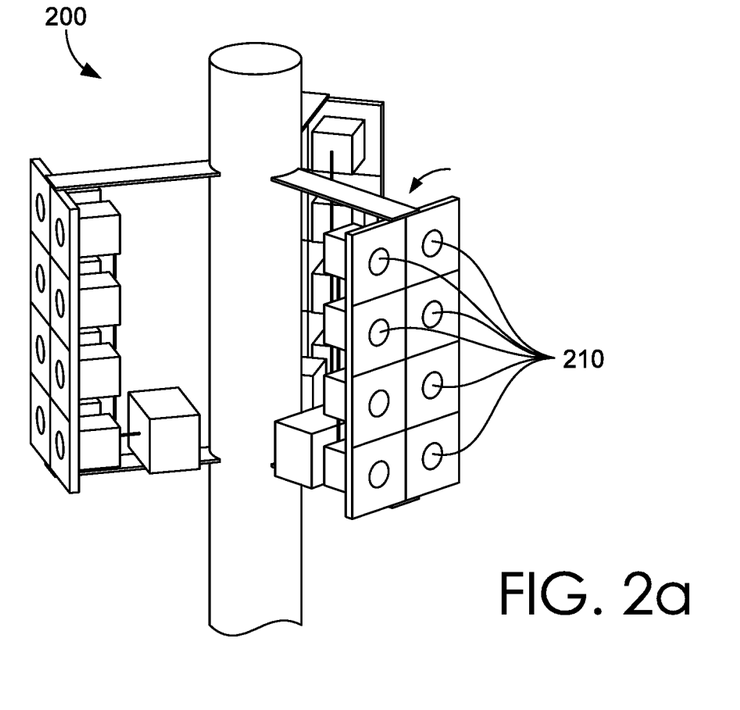
FIGS. 2A-2B each depict a graphical representation of a base station configuration employed to broadcast control plane information suitable for use in further embodiments of the present disclosure.
Figure 2B:
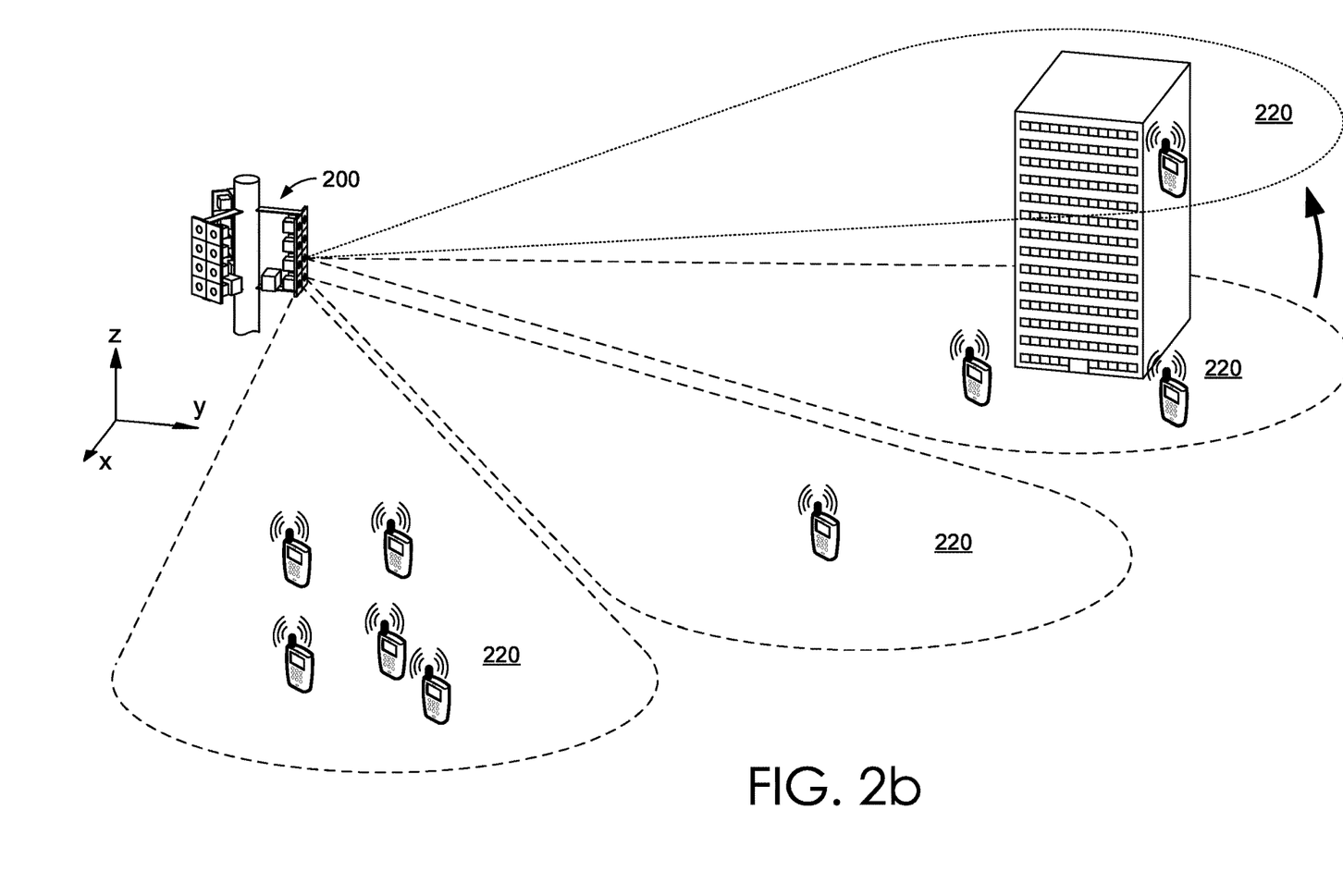

Turning now to FIGS. 2a and 2b, an exemplary base station configuration suitable for use in implementing embodiments of the present disclosure is illustrated and designated generally as base station 200. Base station 200 is but one example of a suitable configuration and is not intended to suggest any limitations as to the scope of use or functionality of embodiments described herein. Neither should the configuration be interpreted as having any dependency or requirement relating to any one or combination of components illustrated.

Base station 200 comprises one or more FD-MIMO antennae having antenna elements 210 and transceivers arranged in an array structure. By way of a non-limiting example, antenna elements 210 may be arranged in an 8×4, 4×8, or 8×8 array. It should be understood that a FD-MIMO antenna in not limited to the aforementioned array structures and may be any other array structure contemplated. For example, the array structure may be 4×4.

Base station can be configured to broadcast control plane information in a vertical orientation or horizontal orientation. Each of the different exemplary beams 220 can be broadcast using one or more of antenna elements 210. Thus, for a particular beam pattern, not all of antenna elements 210 need be employed. This allows for the broadcast of control plane information to be more directed than a non-directional antenna.

Although base station 200 is illustrated with single components, as can be appreciated, the components are scalable and any number of each of the components may exist in the network environment. Further, although not illustrated herein, additional components or combination of components may exist within base station 200. While FIG. 2 is generally described in relation to uplink transmission interference mitigation, as can be appreciated, any other subject node-controlled or operated component(s) are also contemplated in accordance with embodiments described herein.

Figure 3:
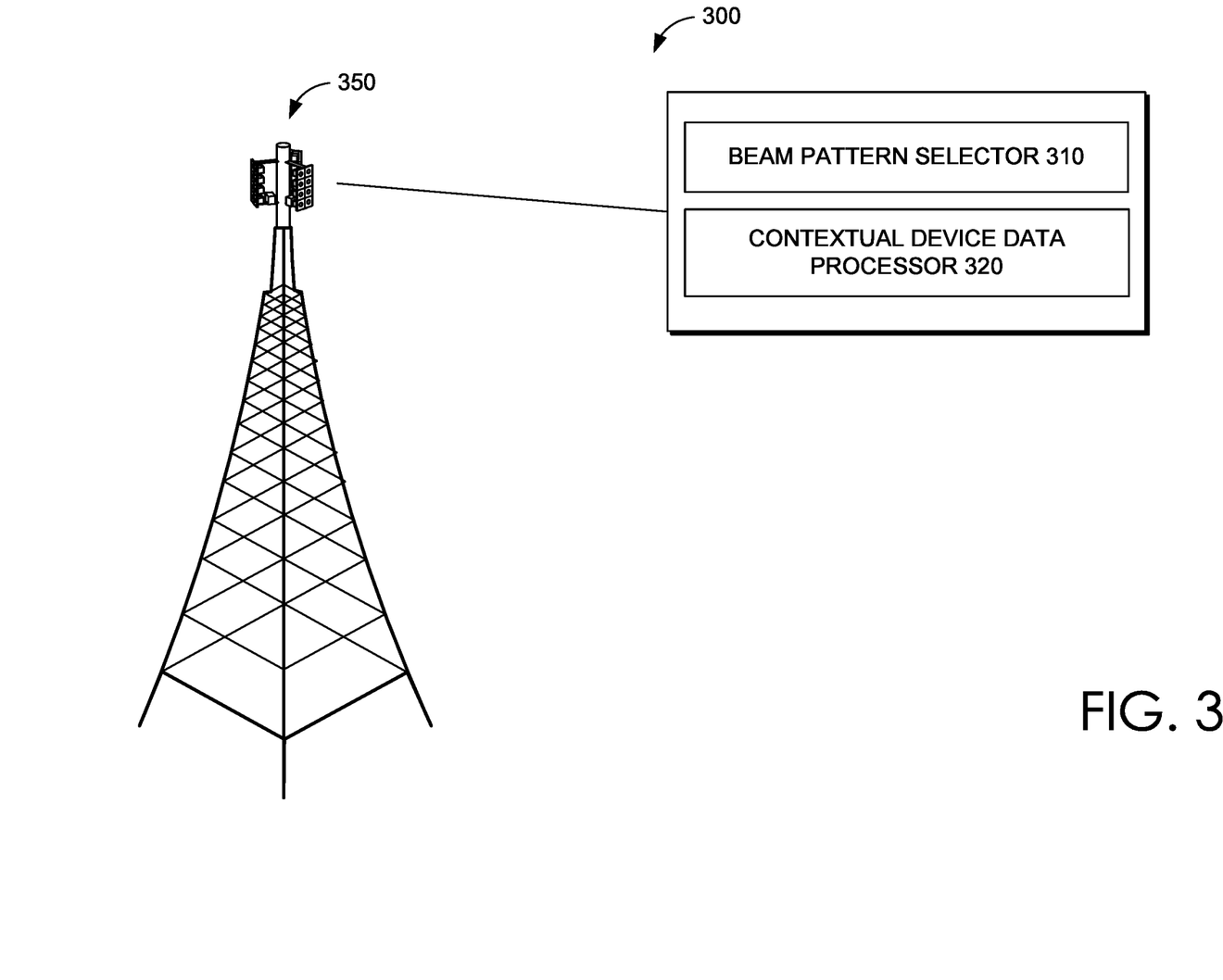
FIG. 3 is a schematic of an exemplary communications environment suitable for use in some embodiments of the present disclosure.

Turning now to FIG. 3, an exemplary network environment suitable for use in implementing embodiments of the present disclosure is illustrated and designated generally as a network environment 300. Network environment 300 is but one example of a suitable network environment and is not intended to suggest any limitations as to the scope of use or functionality of embodiments described herein. Neither should the network environment be interpreted as having any dependency or requirement relating to any one or combination of components illustrated.

Network environment 300 includes a beam pattern selector 310, contextual device data processor 320, and one or more base stations 350, such as the base station described with regard to FIG. 2.

Beam pattern selector 310 is configured to select a desired beam pattern to broadcast control plane information. For example, if user devices are located in particular sectors, a beam pattern can be selected that provides coverage to those sectors. Thus, a beam pattern can be selected that covers areas with higher concentrations of user devices. In some embodiments, the beam patterns are weighted. Thus, for similar coverage areas (or overlapping coverage areas) the beam pattern with the higher weight can be selected. It should be understood that a base station can broadcast multiple beam patterns simultaneously. Thus, a base station can transmit a wide spread beam, a narrow concentrated beam, or split beams, among others. In embodiments, the highest performing beam pattern is selected (which is described in detail further below).

Contextual device data processor 320 receives user device contextual information and is employed (with beam pattern selector) to select a beam pattern. In some embodiments, the user device contextual information includes a user device location. For example, a user device location can be tracked by location reports from user devices themselves or a UE can provide location information, e.g., by eNodeB's location tracking features in LTE, to contextual device data processor 320. This information is employed to determine locations of user devices and select a beam pattern that will provide coverage to those locations. It should be understood that contextual device data need not include user device location information and can be any information that can be employed to select a beam pattern. For example, a time period can be employed to select a beam pattern. During the daytime, a higher concentration of user devices may be located in a commercial district, whereas at night, the user devices are located in a residential district. Based on the time period, the beam pattern selector 310 can select patterns that cover the commercial district in the daytime and the residential district at night. Furthermore, beam pattern selector 310 may use machine learning to optimize the broadcast of control plane information. For example, key performance index (KPI) data (described in further detail below) can be used to select beam patterns that optimize the broadcast of control plane information.

Base stations 350 receive the beam pattern and broadcast the control plane information using the beam pattern. For example, base stations 350 can select at a combination of antenna elements that correspond to the selected beam pattern. The selected antenna elements are used to broadcast the control plane information using the beam pattern.

Figure 4:
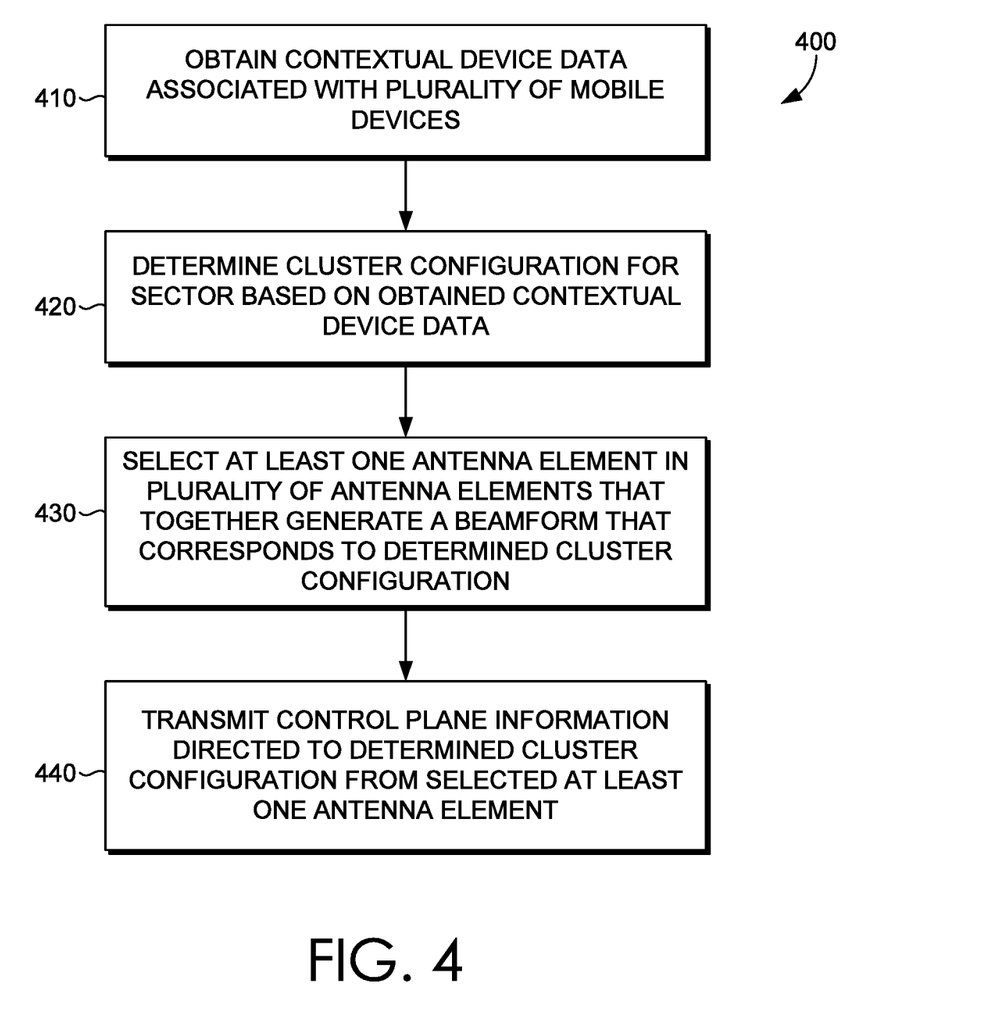
FIG. 4 provides an exemplary method for transmitting control plane information to user equipment, in accordance with some embodiments of the present disclosure.

Turning now to FIG. 4, a method for transmitting control plane information to UE is provided in accordance with embodiments of the present disclosure. With reference to FIG. 4, in embodiments, method 400 can be performed at a base station, such as base station 200 of FIG. 2. Alternatively, method 400 can be performed at a server that manages a plurality of base stations so that a plurality of base stations broadcast a pattern over one or more sectors.

Initially, as indicated at block 410, contextual device data associated with a plurality of mobile devices, such as communications device 100 of FIG. 1, is obtained. In some embodiments, contextual device data includes location data, temporal data, and/or network KPI data. For example, a mobile device can send location data, such as a GPS location, to a base station or other component in coupled communication with the base station (e.g., via the telecommunications network). In some embodiments, the base station or a component thereof uses the location data to determine a beam pattern. In some embodiments, the base station or component thereof communicates the location information to a server that determines the beam patterns and communicates the beam pattern back to the base station. The location data, along with other contextual device data, can be collected for use in determining a cluster configuration for a sector by the base station or one or more servers in communication with the base station.

KPI data is a measure of the performance of the telecommunications network. Examples of KPI data include call connection failure rate, call abnormal drop rate, cell-level average transmission-to-interference-plus-noise ratio (SINR), cell-level 5% SINR, handover success rate, paging success rate, cell-level average data speed, cell-level 5% data speed, and/or a total number of connected user devices. For example, if the call connection failure rate is high for a given cluster configuration applied to the base station, a KPI score for the cluster configuration may be low. Thus, the cluster configuration may not be selected based on the KPI data.

In some embodiments, the cluster configuration is determined for a particular time frame. For example, during normal business hour (e.g., 9 AM to 5 PM), a cluster configuration may be determined for the commercial area. After 5 PM, however, another cluster configuration may be determined for the commercial area, since it is more likely that less people would remain in the commercial are vs. other areas (e.g., residential areas).

In some embodiments, the antenna elements are selected based on a pre-registered beamform weight table. For example, weights can be calculated for beamforms and stored. Based on the weights for a given desired pattern or sector, corresponding beamforms can be selected.

In some embodiments, the cluster configuration includes at least one of a cluster shape, a cluster location, or a cluster orientation. A cluster configuration can be any shape, location, or orientation that captures the location of user devices. For example, based on the location of users, the cluster configuration can be a wide spread cluster, a narrow concentrated, or two split narrow clusters.

At block 420, a cluster configuration for a sector is determined based at least in part on the obtained contextual device data. For example, cluster configurations for a sector can be determined and ranked, and a highest ranked configuration can be selected as the cluster configuration for the sector. It should be understood that a sector can have one or more cluster configurations; in other words, multiple cluster configurations can provide coverage to the same sector.

At block 430, at least one antenna element in a plurality of antenna elements that together generate a beamform that corresponds to the determined cluster configuration is selected. The at least one antenna element is selected based on the determined cluster configuration. For example, the determined cluster configuration may identify which antenna elements of the plurality of antenna elements to broadcast the control plane information. Thus, only those antenna elements selected are employed the broadcast the control plane information. This allows for the transmission for the control plane information to be stronger, since only those antenna elements that broadcast the control plane information to the sector are selected while preventing interference from other antenna elements.

At block 440, control plane information that is directed to the determined cluster configuration is transmitted from the selected at least one antenna element. Thus, the control plane information can be broadcast to the mobile user devices in the sector.

Figure 5:
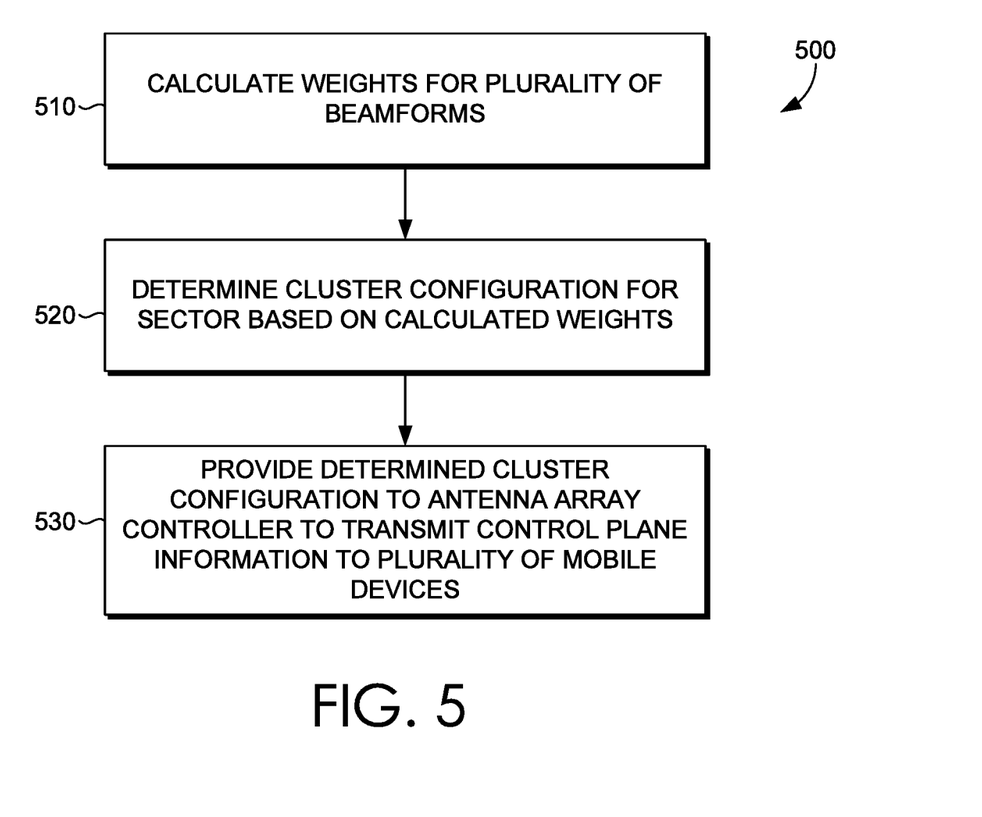
FIG. 5 provides another exemplary method for transmitting control plane information to user equipment, in accordance with some embodiments of the present disclosure.

Turning now to FIG. 5, in embodiments, method 500 can be performed at a base station, such as base station 200 of FIG. 2. Alternatively, method 500 can be performed at a server that manages a plurality of base stations so that a plurality of base stations broadcast a pattern over one or more sectors.

Initially, as indicated at block 510, weights for a plurality of beamforms are calculated. For example, each beamform can be given a weight based on its performance in a given sector. In some embodiments, the weights are calculated using computer simulation.

At block 520, a cluster configuration is determined based on the calculated weights. For example, for a given sector, the beamforms may be arranged in a cluster configuration, and the cluster configuration that provides the best coverage for a given sector or sectors may be selected. In some embodiments, control information for the broadcast beam pattern is stored.

At block 530, the determined cluster configuration is provided to an antenna array controller to transmit control plane information to a plurality of mobile devices, the control plane information being transmitted by at least one antenna element in a plurality of antenna elements of a base station that is directed to the determined cluster configuration. The antenna array controller allows the at least one antenna element to transmit the control plane information that is directed to the determined cluster configuration Thus, the base station can broadcast control plane information using the determined cluster configuration as applied to the antenna elements of the base station.

In some embodiments, it can be further determined that a quality of the control plane information being transmitted by at least one antenna element drops below an expected value during a beam interval. For example, the control plane information may not be received by user devices in a given sector. Thus, another cluster configuration can be determined based on the calculated weights; and the determined another cluster configuration can be applied to the base station.

In some embodiments, a matching pattern can be searched among at least one of pre-registered beam patterns or group-level pre-registered beams. Thus, for a given sector, a matching pattern can be found that provides coverage to all user devices in that sector.

In some embodiments, receiving Global Positioning System (GPS) location information is received from a plurality of UE; beam patterns are selected that match a distribution of the GPS location information; and weights are calculated for the selected beam patterns that match the distribution of the GPS location information.

It will be understood by those of ordinary skill in the art that the order of steps shown in the method 400 of FIG. 4 and method 500 of FIG. 5 are not meant to limit the scope of the present disclosures in any way and, in fact, the steps may occur in a variety of different sequences within embodiments hereof. Any and all such variations, and any combination thereof, are contemplated to be within the scope of embodiments described herein.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computer-implemented method for transmitting control plane information to user equipment (UE), the method comprising:
    obtaining contextual device data determined by one or more UE associated with a plurality of UE, wherein the contextual device data includes at least one of location data or temporal data;
    determining a cluster configuration for a sector based at least in part on the obtained contextual device data;
    selecting, based on the determined cluster configuration, at least one antenna element in a plurality of antenna elements that together generate a beamform that corresponds to the determined cluster configuration; and
    transmitting, from the selected at least one antenna element and to the one or more UE, control plane information that is directed to the determined cluster configuration.

2. The method of claim 1, wherein the location data is Global Positioning System (GPS) location information.

3. The method of claim 1, wherein the cluster configuration is further determined for a particular time frame that corresponds to the temporal data.

4. The method of claim 1, wherein the plurality of antenna elements is associated with a single base station.

5. The method of claim 1, wherein the at least one antenna element is selected based further on a referenced pre-registered beamform weight table.

6. The method of claim 1, wherein the cluster configuration includes at least one of a cluster shape, a cluster location, or a cluster orientation.

7. The method of claim 1, wherein the method further comprises:
    determining another cluster configuration for the sector based on measured network key performance index (KPI) data associated with the determined cluster configuration.

8. The method of claim 1, wherein the cluster configuration is determined based further in part on obtained network key performance index (KPI) data associated with the plurality of UE.

9. A non-transitory computer storage medium storing computer-useable instructions that, when used by one or more computing devices, cause the one or more computing devices to perform operations comprising:
    calculating weights for a plurality of beamforms that are each generated based on obtained location data determined by each user equipment (UE) associated with a plurality of UE;
    determining a cluster configuration for a sector based on the calculated weights; and providing the determined cluster configuration to an antenna array controller to transmit control plane information to the plurality of UE, the control plane information being transmitted by at least one antenna element in a plurality of antenna elements of a base station that is directed to the determined cluster configuration.

10. The medium of claim 9, wherein the weights are calculated using computer simulation.

11. The medium of claim 9, wherein the instructions further cause the one or more computing devices to perform operations comprising:
   determining that a quality of the control plane information being transmitted by at least one antenna element drops below an expected value during a beam interval;
   determining another cluster configuration based on the calculated weights; and
   applying the determined another cluster configuration to the base station.

12. The medium of claim 11, wherein the determining cluster configuration for a sector based on the calculated weights comprises searching for a matching pattern among at least one of pre-registered beam patterns or group-level pre-registered beams.

13. The medium of claim 9, wherein the instructions further cause the one or more computing devices to perform operations comprising:
   receiving Global Positioning System (GPS) location information determined by the each user equipment (UE) associated with the plurality of UE;
   selecting beam patterns that match a distribution of the GPS location information; and
   calculating weights for the selected beam patterns that match the distribution of the GPS location information.

14. The medium of claim 9, wherein the base station is a Full Dimension MIMO (FD-MIMO) base station.

15. A system comprising:
   a base station having an antenna comprising an array of antenna elements;
   one or more processors; and
   one or more computer storage media storing computer-usable instructions that, when used by the one or more processors, cause the one or more processors to:
   obtain contextual device data determined by each mobile device associated with a plurality of mobile devices;
   determine one or more cluster configurations for a sector based at least in part on the obtained contextual device data;
   select one of the one or more cluster configurations based on pre-determined weights assigned to the one or more cluster configurations;
   select, based on the selected cluster configuration, at least one antenna element of the plurality of antenna elements of the base station that together generate a beamform that corresponds to the selected cluster configuration; and
   transmit, from the selected at least one antenna element and to the each mobile device, control plane information that is directed to the selected cluster configuration, wherein transmitting the control plane information comprises sending a beam identifier to the base station, the base station using the beam identifier to select the at least one antenna element.

16. The system of claim 15, wherein the weights are calculated from at least one of call connection failure rate, call abnormal drop rate, cell-level average transmission-to-interference-plus-noise ratio (SINR), cell-level 5% SINR, handover success rate, paging success rate, cell-level average data speed, cell-level 5% data speed, or a total number of connected user devices.

17. The system of claim 15, wherein transmitting the control plane information comprises broadcasting the control plane information to the plurality of mobile devices using the at least one antenna element corresponding to the determined cluster configuration.

18. The system of claim 15, wherein the determining the one or more cluster configurations comprises selecting at least one predetermined cluster configuration.

* * * * *